United States Patent [19]
Adams et al.

[11] Patent Number: 6,019,347
[45] Date of Patent: Feb. 1, 2000

[54] PULSE WIDTH MODULATED GAS FLOW CONTROL VALVE

[75] Inventors: Rory K. Adams, Kalamazoo; Charles J. Bowden, Battle Creek; Steven R. Pride, II, Kalamazoo, all of Mich.

[73] Assignee: Fema Corporation of Michigan, Portage, Mich.

[21] Appl. No.: 09/042,119

[22] Filed: Mar. 13, 1998

[51] Int. Cl.[7] .................................................. F16K 31/02
[52] U.S. Cl. .............................. 251/129.21; 251/129.05; 335/261; 335/279; 335/281
[58] Field of Search .................... 251/129.05, 129.15, 251/129.21; 335/261, 279, 281, 297

[56] References Cited

U.S. PATENT DOCUMENTS

| | | | |
|---|---|---|---|
| 3,993,972 | 11/1976 | Barbrook | 335/297 |
| 5,032,947 | 7/1991 | Li et al. | 335/297 |
| 5,560,585 | 10/1996 | Krimmer et al. | 251/129.21 |
| 5,565,832 | 10/1996 | Haller et al. | 335/261 |

*Primary Examiner*—Kevin Shaver
*Assistant Examiner*—Eric Keasel
*Attorney, Agent, or Firm*—Flynn, Thiel, Boutell & Tanis, P.C.

[57] ABSTRACT

A gas flow control valve for quietly regulating the flow of a gas. The valve includes first and second coaxially oriented elongate tubes of magnetic material and an elongate sleeve of nonmagnetic material coaxially connecting the tubes. An electric coil assembly is disposed around the sleeve. A cover of magnetic material is provided around the coil and is in contact with the tubes. A nozzle opening is disposed within the first tube and has a valve seat encircling the nozzle opening. An elongate armature is axially slidably disposed within the sleeve and the first and second tubes and is moveable between first and second positions. The armature has a first end with an elastomeric seal member which abuts the valve seat when the armature is in the first position thereof to block the flow of gas. The armature further includes a gas flow passageway extending axially to a second end thereof. An elastically yieldable member is provided for continually urging the armature toward the first position thereof. The coil assembly, cover and the tubes are configured to effect a magnetically inspired axial movement of the armature, against the urging of the elastically yieldable member, to the second position and be magnetically stopped thereat, all in response to an electrical energizing of the coil assembly, to draw the first closed end away from the valve seat to a selected spacing to allow a sufficient pressure drop to occur across the spacing and a flow of gas through the valve. The magnetic stop and the elastomeric seal member effect a quiet opening and closing operation of the valve.

16 Claims, 2 Drawing Sheets

PULSE WIDTH MODULATED GAS FLOW CONTROL VALVE

This invention relates to a gas flow control valve for regulating the flow of gas through a tube or pipeline and, more particularly, to a variable pulse width modulated gas control valve for regulating the flow of gas therethrough.

BACKGROUND OF THE INVENTION

Various types of gas control valves have been utilized to control the flow of gas, such as gate valves, ball valves, needle valves etc. Solenoid activated control valves use a solenoid to actuate the valve mechanism. Solenoids are electromechanical devices which can produce mechanical movement in response to a magnetic field. In a typical prior art solenoid, a series of windings is wrapped around a cylindrical core to form a magnetic pole. When a voltage is applied to the windings, the magnetic field causes the armature to move relative to the pole. An oppositely directed spring returns the armature to its previous position once the applied voltage is removed.

In the aforesaid construction, the armature is driven into engagement with magnetic pole which forms a mechanical stop to limit the travel of the armature in one direction. The force at which the armature strikes the stop generates a significant sound. The level of noise produced by a conventional valve is typically not a consideration of many industrial and vehicle applications where they are employed. However, in pulse width modulated control environments where the armature is striking the stop many times per second, the noise is appreciable and very annoying, especially when employed in a consumer appliance, such as a gas stove.

Accordingly, it is an object of this invention to provide a pulse width modulated gas flow control valve which operates silently.

It is a further object of this invention to provide a pulse width modulated gas flow control valve, as aforesaid, wherein the movement of the armature is stopped magnetically in one direction and by engagement of a soft material elastomeric member with a fixed stop in the other direction.

It is a further object of this invention to provide a pulse width modulated gas flow control valve, as aforesaid, wherein the valve is durably constructed and is maintenance free.

SUMMARY OF THE INVENTION

The objects and purposes of the invention have been met by providing a gas flow control valve for quietly regulating the flow of a gas. The valve includes first and second coaxially oriented and axially spaced elongate tubes of magnetic material, each having a hollow interior for conducting the gas. An elongate sleeve of nonmagnetic material coaxially connects the tubes. An electric coil assembly is disposed around the sleeve. A nozzle opening is disposed within the first tube and has a valve seat encircling the nozzle opening. An elongate armature is axially slidably disposed within the sleeve and the first and second tubes and is moveable between first and second positions. The armature has a first closed end with an elastomeric seal member which abuts the valve seat when the armature is in the first position thereof to block the flow of gas. The armature further includes a gas flow passageway extending axially to a second end thereof. An elastically yieldable member is provided for continually urging the armature toward the first position thereof. The coil assembly and the first and second tubes are configured to effect a magnetically inspired axial movement of the armature, against the urging of the elastically yieldable member, to the second position and be magnetically stopped thereat in response to an electrical energizing of the coil assembly to draw the first closed end away from the valve seat to a selected spacing to allow a sufficient pressure drop to occur across the spacing and a flow of gas through the nozzle opening and axially of the gas flow passageway. The magnetic stop and the elastomeric seal member effect a quiet opening and closing operation of the valve.

BRIEF DESCRIPTION OF THE DRAWINGS

Other objects and purposes of the invention will become apparent to those skilled in the art upon a reading of the following specification and with reference to the accompanying drawings, in which.

DETAILED DESCRIPTION

Figure 1:
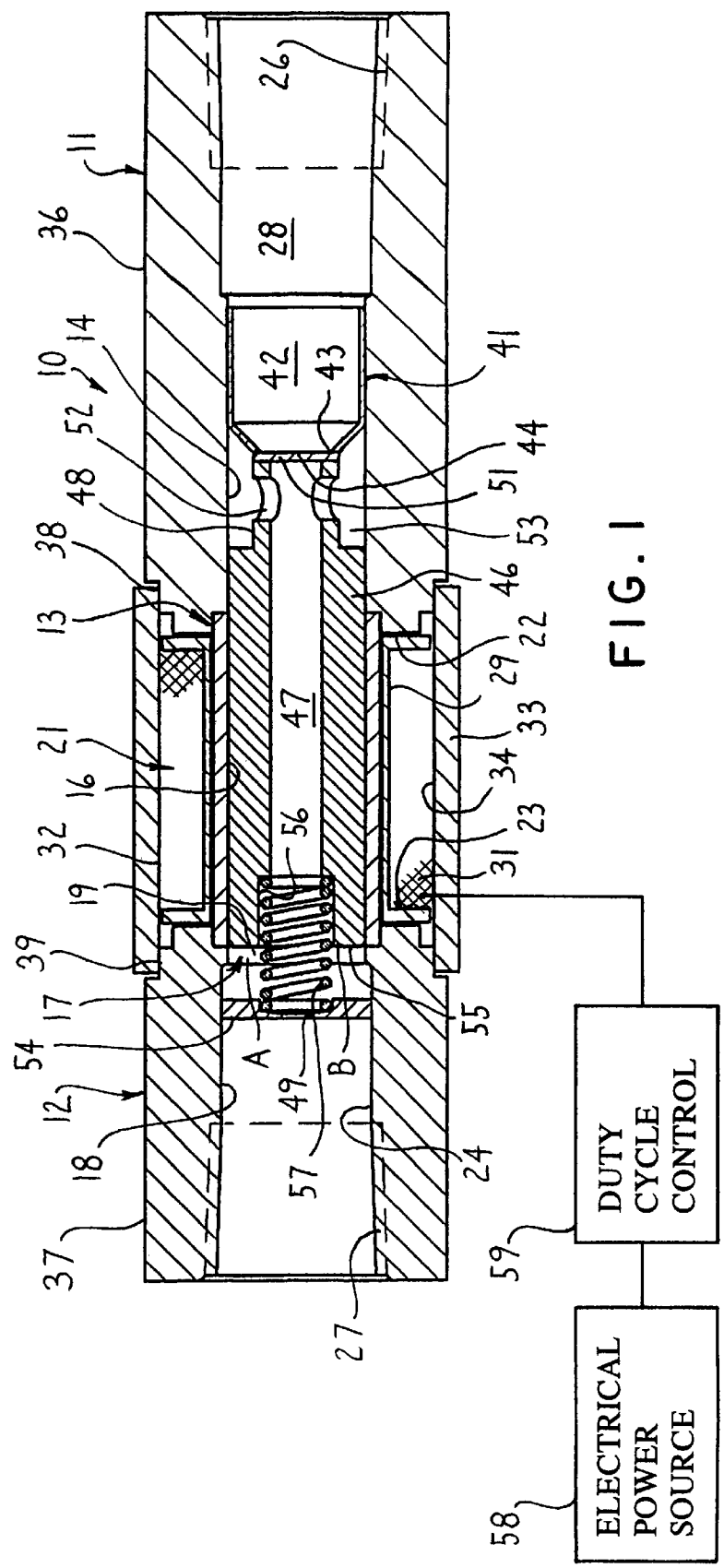
FIG. 1 is a central cross sectional view of the pulse width modulated gas flow control valve embodying the invention and showing the valve in its closed position.

A gas flow control valve 10 embodying the invention is illustrated in the drawings. The valve 10 includes a pair of hollow magnetic material tubes 11 and 12 interconnected by a hollow nonmagnetic material sleeve 13. In this particular embodiment, the tubes 11 and 12 as well as the sleeve 13 are coaxially oriented with the interior surfaces 14 and 16 of the tube 11 and the sleeve 13, respectively, being flush with one another. A radially inwardly extending annular rib 17 of a finite width is provided on the interior 18 of the tube 12, the radially inwardly facing surface 19 of which is flush with the surfaces 14 and 16. The sleeve 13 is connected to the two tubes 11 and 12 by any conventional fastening, such as by welding or brazing or an equivalent thereto.

In this particular embodiment, the wall thickness of the magnetic tube 11 and the part of the tube 12 whereat is located the annular rib 17 are the same. The wall thickness of the sleeve 13 is thinner than the aforesaid wall thickness dimensions so that an annular channel 21 is defined between the mutually facing end faces 22 and 23 of the tubes 11 and 12, respectively. The flush relationship between the surfaces 14, 16 and 19 is acquired by a machining thereof to a close tolerance dimension. The interior surface 24 of the interior 18 of the tube 12 to the left of the annular rib 17 is larger in diameter than the diameter of the inwardly facing surface 19 on the rib 17. The ends of the respective tubes 11 and 12 remote from each other each include respective internal threads 26 and 27 to accommodate a sealed connection of a central passageway 28 through the valve 10 to externally oriented pipes tubes not illustrated. One of the not illustrated external pipes or tubes connected to the internal threads 27 is connected to a pressurized supply of gas, either natural gas or propane or equivalent, whereas another not illustrated external pipe or tube connected to the internal threads 26 is connected to a gas consumer, such as a gas stove appliance or other type of gas consuming appliance requiring a regulated control of the gas flow thereto.

A preferably two piece plastic cylindrical bobbin 29, that is, two half cylindrical pieces connected in a conventional manner to form a cylinder, is provided in the channel 21 and is wound with small diameter wire, schematically illustrated as at 31, a specified number of turns to generate a sufficient flux when electrically energized. The wound wire and bobbin form a coil assembly. The radially outer surface 32 of the coil assembly is covered by a longitudinally split (not illustrated) magnetic material cover 33 having an interior surface 34 that is less in diameter than an exterior surface 36 and 37 on the respective tubes 11 and 12. As a result, the interior surface 34 of the cylindrical cover 33 can initially be expanded and slid axially onto an exterior surface 36 or 37 of the respective tube 11 or 12, and after the two piece bobbin 29 has been wound with wire 31, the cover 33 can be slid axially over the outer surface 32 of the wire 31. The elastic characteristic of the material of the cover 33 will cause the diameter of the interior surface 34 to reduce to the diameter of the mutually facing ends 22 and 23 of tubes 11 and 12. In this particular embodiment, the mutually facing ends 22 and 23 of the tubes 11 and 12 are provided with annular grooves 38 and 39, respectively, to receive therein the respective axial ends of the cover 33, and the diameter of the interior surface 34 of the cover 33 in the relaxed state thereof is slightly less in diameter than the diameter of the grooves 38 and 39 so that the cover is held snugly in place on the valve 10 and completes the magnetic flux path. It is within the scope of this invention to provide a two piece cover 33, such as two half cylinder pieces snap fit together to form a protective cylindrical cover protecting the windings 31 from outside mechanical damage. It is also within the scope of this invention to provide a one piece bobbin longitudinally slit like the cover 33.

A nozzle member 41 is provided in the central passageway 28 in the valve 10 adjacent the internal thread 26. The nozzle member 41 includes a through opening 42 and a reduced diameter nozzle outlet 43 defining a valve seat 44 around the perimeter thereof and which is oriented preferably in a plane perpendicular to a longitudinal axis of the central passageway 28.

A hollow sleeve-like armature 46 is reciprocally slidably received in the central passageway 28 of the valve 10. The exterior surface of the armature is machined to a close tolerance sliding fit in the central passageway 28. The hollow armature 46 has a central axially extending passageway 47 opening outwardly of the armature at the left end 55 thereof. The right end of the armature 46 has a reduced diameter extension 48 terminating in a closed end face in the form of a soft stop defined by an elastomeric seal member 51 oriented to engage the valve seat 44 and sealing close the nozzle outlet 43 when the armature 46 is in the position illustrated in FIG. 1. The reduced diameter extension 48 has a radially extending passageway 52 therethrough providing communication between the central passageway 47 of the armature 46 and an annular chamber 53 defined by the radial clearance between the outside diameter of the reduced diameter extension 48 and the interior surface 14 of the tube 11.

An annular abutment 54 is provided in the tube 12 at a location spaced to the left of the annular rib 17. In this particular embodiment, the annular abutment 54 is a washer like member with a hole 49 therethrough forced fit into the large diameter portion 24 of the central passageway 28 of the tube 12. The left end 55 of the armature 46 mutually facing the abutment 54 is flat and is oriented in a plane perpendicular to the longitudinal axis of the armature 46. A recess 56 that is an enlargement of the diameter of the central passageway 47 is provided in the left end face 55 of the armature 46. One end of an elastomeric member 57, such as a compression spring, is received in the recess 56 whereas the other end abuts against the abutment 54. The elastomeric member 57, or spring, performs the function of urging the armature 46 to the right to cause the elastomeric seal member 51 to tightly engage the valve seat 44 to sealingly close off the nozzle outlet 43 and to mechanically preload the armature 46 prior to and during its motion away from the valve seat 44.

Electrical energy is supplied by an electrical power source 58, such as a battery or a conventional electrical outlet supplying 110 volts AC at 60 hertz. The electrical energy, if AC, is rectified and preferably clipped to, in this particular embodiment, 40 volts DC. The resistance of the windings 31 in the coil assembly is such that about 200 milliamps will always be delivered to the coil assembly thereby assuring the generation of a sufficient amount of magnetic flux therefrom. A duty cycle control device 59 is provided to convert the DC current from the electrical supply into a controllable pulsating current whereby the ratio of on time to off time, namely the duty cycle, of the pulsating current to the coil assembly is selectively regulated. In this particular embodiment, the duty cycle has an operable frequency in the range of 20 to 70 hertz. In other words, the valve 10 is operated to preferably open and close 20 to 70 times every second.

OPERATION

The operation of the gas flow control valve 10 will be apparent to those skilled in the art by reference to the above set forth detailed description and accompanying drawings. However, a brief discussion of the operation is set forth below for convenience.

Figure 2:
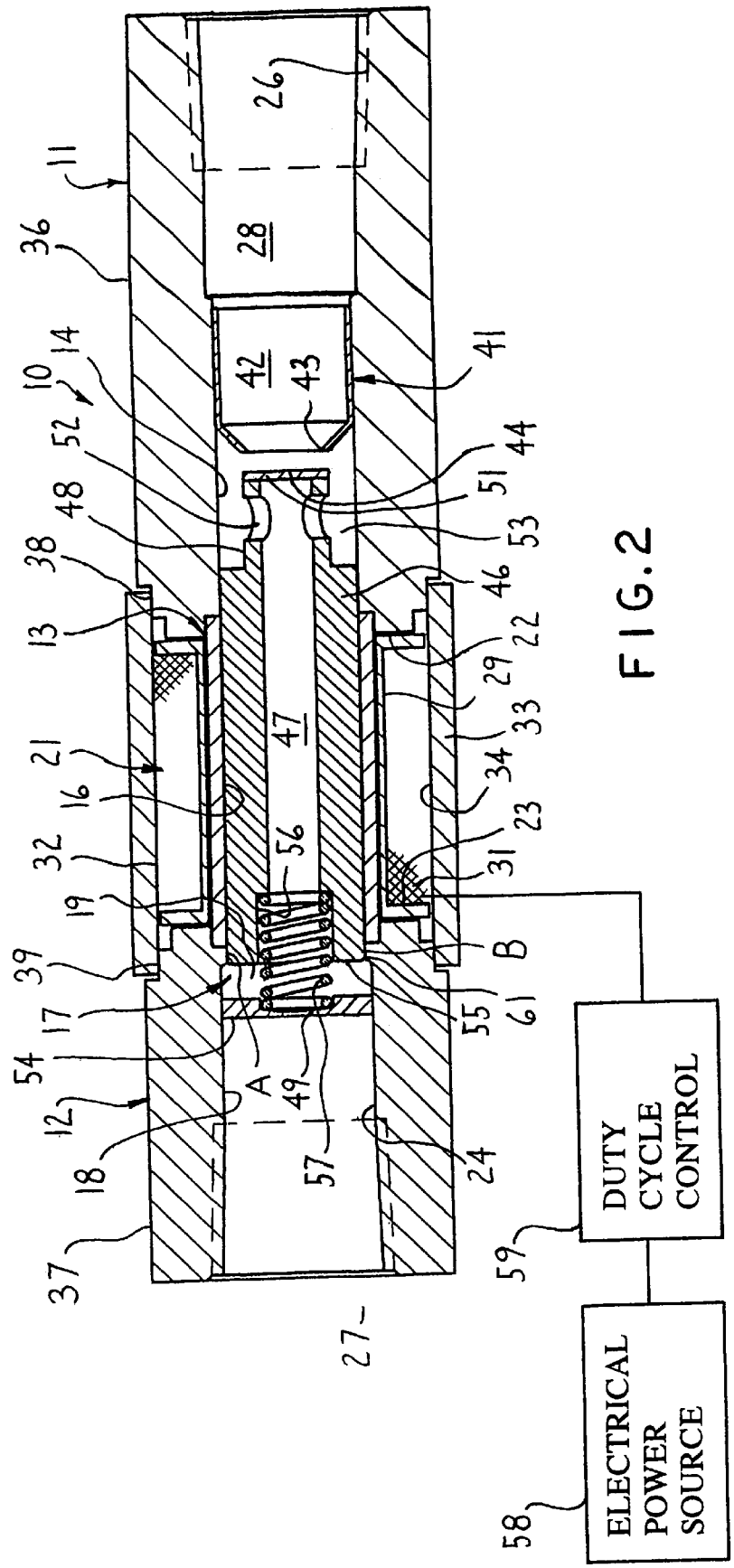
FIG. 2 is a central cross sectional view of the valve in its open position.

The electrical power source 58 is activated and the duty cycle control device 59 adjusted to provide the desired duty cycle frequency to the coil assembly. During the on time portion of the duty cycle, the coil assembly will generate sufficient magnetic flux which will traverse the magnetic material tubes 11 and 12 and cover 33 to form axially spaced, attracting magnetic poles A and B at the surface 19 of the rib 17 and the left end face 55 of the armature 46. As a result, the armature 46 will be magnetically urged to the left to the position illustrated in FIG. 2 whereat the magnetic poles radially face one another. Radially opposing pole faces will not produce any further axial movement of the armature 46. In other words, the armature 46 is stopped silently by now radially aligned pole faces defined by the radially inwardly facing surface 19 (pole A) on the rib 17 and an exterior radially outwardly facing surface 61 (pole B) immediately adjacent the left end face 55 of the armature. In this particular embodiment, the elastomeric seal member 51 will have been moved to the left to form a gap of about 0.020 to 0.030 inches between the seal member 51 and the valve seat 44 to facilitate a sufficient pressure drop thereat to cause gas flow to occur from the valve inlet defined by the threaded connection 27 through the passageways 49, 47, and 52 into the chamber 53 and thence through the gap to the valve outlet defined by the threaded connection 26. During the off time part of the duty cycle, the elastomeric member 57, or spring, will effect a movement of the armature 46 to the right to cause the elastomeric seal member 51 to silently contact the valve seat 44 to close off the nozzle outlet 43.

The movement of the armature to the left can be impeded by magnetic side loading forces urging the armature 46 into contact with the interior surfaces 14, 16 and 19. To overcome this problem, this invention employs a thin coating of a nonmagnetic material on the armature outer surface and surfaces 14, 16 and 19 in passageway 28. Typically, a 0.001 inch thick electrolysis nickel is plated on the armature outer surface and, in addition, is plated 0.0005 inch thick on surfaces 14, 16 and 19 so that the interfacing surfaces of the nickel coating slidingly engage each other in close tolerance relation in the central passageway 28. In other words, a uniform space is provided between the unplated surfaces 14, 16 and 19 and the unplated and close tolerance finished (i.e., machined) exterior surface of the armature 46, that space being occupied by the nickel coatings.

While the operation of the valve 10 occurs utilizing 200 milliamps to the coil assembly, it is to recognize that other currents can be utilized without departing from the spirit of this invention.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A gas flow control valve for quietly regulating the flow of a gas, comprising:
    first and second coaxially oriented elongate tubes of magnetic material, each having a hollow interior for conducting the gas;
    an elongate sleeve of nonmagnetic material coaxially connecting said tubes;
    an electric coil assembly disposed around said sleeve;
    a cylindrical cover of magnetic material around the coil and contacting said magnetic material tubes;
    a nozzle opening disposed within said first tube and having a valve seat encircling said nozzle opening;
    an elongate armature axially slidably disposed within said sleeve and said first and second tubes and between first and second positions, said armature having a first closed end, said first closed end abutting said valve seat when said armature is in said first position thereof to block the flow of gas, said armature further including means defining a gas flow passageway extending axially to a second end thereof;
    elastically yieldable means for continually urging said armature toward said first position thereof; and
    said coil assembly and said second tube being configured to effect a magnetically inspired axial movement of said armature, against the urging of said elastically yieldable means, to said second position and be magnetically stopped thereat in response to an electrical energizing of said coil assembly to draw said first closed end away from said valve seat to a selected spacing to allow a sufficient pressure drop to occur across said spacing and a flow of gas through said nozzle opening and axially of said gas flow passageway, said second tube being free of armature movement impeding mechanical stops intermediate said first and second positions of said armature.

2. The gas flow control valve according to claim 1, wherein said coil assembly includes control means for energizing said coil assembly with a DC pulsed current having a variable ratio of on time to off time.

3. The gas flow control valve according to claim 2, wherein said pulsed current is at a frequency in the range of 20 to 70 hertz.

4. The gas flow control valve according to claim 3, wherein said pulsed current is a constant current.

5. The gas flow control valve according to claim 1, wherein said second tube includes a spring abutment in an interior thereof, and wherein said elastically yieldable means is a compression spring oriented between said second end of said armature and said spring abutment.

6. The gas flow control valve according to claim 5, wherein said spring abutment is a first annular rib projecting radially inwardly from an interior wall of said second tube.

7. The gas flow control valve according to claim 6, wherein said second tube includes a second annular rib projecting radially from an interior wall of said second tube and being axially spaced from said first annular rib, an interior surface of said second annular rib being flush with interior surfaces of said sleeve and said first tube, an interior surface of said second tube between said first and second annular ribs being of a greater diameter than a diameter of said interior surface of said second annular rib.

8. The gas flow control valve according to claim 7, wherein said first end of said armature includes an elastomeric seal member abutting said valve seat when said armature is in said first position thereof.

9. The gas flow control valve according to claim 1, wherein said second tube includes an annular rib projecting radially from an interior wall of said second tube, an interior surface of said annular rib being flush with an interior surface of said sleeve and said first tube, said second end of said armature being axially spaced from said interior surface of said annular rib when in said first position thereof blocking gas flow.

10. The gas flow control valve according to claim 1, wherein said armature is a hollow sleeve having a central passageway therethrough defining said gas flow passageway, said armature having a reduced diameter extension extending axially and terminating at said first end, an exterior surface of said reduced diameter extension having a radially extending passageway therethrough connecting said central passageway to an annular chamber between exterior surface of said reduced diameter extension and an interior surface of said first tube, so that when said armature is magnetically driven to said second position thereof, gas will flow through said central passageway and said radially extending passageway into said chamber and thence into said nozzle opening.

11. The gas flow control valve according to claim 1, wherein said first end of said armature includes an elastomeric seal member abutting said valve seat when said armature is in said first position thereof.

12. The gas flow control valve according to claim 1, wherein said armature has an outer surface coating of a nonmagnetic material which interfaces an interior surface of said first and second tubes and said sleeve.

13. The gas flow control valve according to claim 12, wherein said nonmagnetic material is an electroplated nickel.

14. The gas flow control valve according to claim 12, wherein said surface coating of nonmagnetic material is 0.001 inches thick, and wherein an outer surface of said nonmagnetic material and an interior surface of each of said first and second tubes and said sleeve is a close tolerance sliding fit to form a generally uniform gap therebetween and to reduce a magnetic side loading force on said armature when said electric coil assembly is energized.

15. The gas flow control valve according to claim 14, wherein said interior surfaces of said first and second tubes and said sleeve that interface with said armature are coated with a nonmagnetic material.

16. The gas flow control valve according to claim 15, wherein said coating on said first and second tubes and said sleeve is an electroplated nickel that is 0.0005 inches thick.

* * * * *